US008233596B2

(12) United States Patent
Cho

(10) Patent No.: US 8,233,596 B2
(45) Date of Patent: Jul. 31, 2012

(54) PROVIDING SUBSCRIBER INFORMATION IN VOICE OVER IP (VOIP) SYSTEM

(75) Inventor: Seong-Kwan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2072 days.

(21) Appl. No.: 11/233,069

(22) Filed: Sep. 23, 2005

(65) Prior Publication Data

US 2006/0067308 A1      Mar. 30, 2006

(30) Foreign Application Priority Data

Sep. 24, 2004   (KR) ................ 10-2004-0077170

(51) Int. Cl.
    *H04M 1/64*   (2006.01)
(52) U.S. Cl. .............. 379/88.19; 379/88.21; 379/142.04
(58) Field of Classification Search ............... 379/88.19, 379/88.21, 142.04, 142.06; 455/415
    See application file for complete search history.

(56) References Cited

U.S. PATENT DOCUMENTS

| 5,864,612 | A  | * | 1/1999  | Strauss et al. ........... 379/142.03 |
| 5,966,651 | A  | * | 10/1999 | Sibecas ................... 455/412.2  |
| 6,343,071 | B1 | * | 1/2002  | Lansford ................. 370/338    |
| 2002/0172338 | A1 | * | 11/2002 | Lee et al. .............. 379/142.01 |
| 2003/0063730 | A1 | * | 4/2003  | Woodring ............... 379/207.15 |
| 2004/0047339 | A1 | * | 3/2004  | Wang et al. ............ 370/352    |
| 2004/0209605 | A1 | * | 10/2004 | Urban et al. ........... 455/415    |

FOREIGN PATENT DOCUMENTS

| KR | 10-2004-0063572 | 7/2004 |
| KR | 2004085439 A  * | 10/2004 |

OTHER PUBLICATIONS

Handley et al., SIP: Session Initiation Protocol, Mar. 1999, RFC 2543, pp. 32.*
Donovan, SIP INFO Method, Oct. 2000, RFC 2976, pp. 1-2.*
Korean Office Action corresponding to Korean Patent Application No. 2004-0077170, issued on Jul. 26, 2006.
Rosenberg et al., "SIP: Session Initiation Protocol", Network Working Group, Request for Comments: 3261, Jun. 2002, pp. 1-269.
Handley et al., "SDP: Session Description Protocol", Network Working Group, Request for Comments: 2327, Apr. 1998, pp. 1-42.

* cited by examiner

*Primary Examiner* — Quynh Nguyen
*Assistant Examiner* — Jirapon Intavong
(74) *Attorney, Agent, or Firm* — H.C. Park & Associates, PLC

(57) ABSTRACT

Subscriber information is provided in a Voice over IP (VoIP) system by transmitting multimedia data (e.g., graphics data or image data) depending on Caller Identification (CID) information of respective IP terminals connected to the VoIP system to a called IP terminal, or to broadcast multimedia data to the respective IP terminals belonging to each group in response to a subscriber's request while managing address information of the respective IP terminals.

9 Claims, 12 Drawing Sheets

FIG. 6

| REGISTRATION DETERMINATION (a) | DESIGNATION(b) | CHARACTER STRING (c) | DATA(d) |
|---|---|---|---|
| O | O | "caller_id0" | "../mypic0" |
| X | X | "caller_id1" | "../mypic1" |
| O | X | "caller_id2" | "sp_data" |

FIG. 7A

20 { INVITE sip : kim@snu.ac.kr SIP/2.0

21 {
Via : SIP/2.0/UDP 1ad.madang.ajou.ac.kr:5060
TO : S.J.Kim<sip:kim@snu.ac.kr>
From : S.W.Yoo<sip:yoo@madang.ac.kr
Call-ID : 123456789!@lab.madang.ac.kr
CSeq : 1 INVITE 22 { Subject : About internet Telephony 23 {
Content - type : application/sdp
Content - Length : 157

24 { <CR LF>

25 {
V = 0
o = Yoo 2890866226 2890844526 in IP4 lab.madang.ajou.ac.kr
s = phone call
c = IN IP4 100.101.102.103
T = 0 0
m = audio 49170 RTP/AVP 0
a = trpmap : 0 PCMU/8000

FIG. 7B

REGISTER sip : 1000@10.0.0.1 SIP/2.0
To : caller_id0 <sip:1000@10.0.0.1>
From : caller_id0 <sip:1000@10.0.0.1>
Contact : caller_id0 <sip:1000@10.0.0.1>
Call-ID : 0ha0isndaksdj@10.0.0.1
CSeq : 1 REGISTER
Via : SIP/2.0/UDP 135.180.130.133

26 { Expires : Sat, 01 Dec 2040 16:00:00 GMT

FIG. 7C

```
REGISTER sip : 1000@10.0.0.1 SIP/2.0
To : caller_id1 <sip:1000@10.0.0.1>
From : caller_id1 <sip:1000@10.0.0.1>
Contact : caller_id1 <sip:1000@10.0.0.1>
Call-ID : 0ha0isndaksdj@10.0.0.1
CSeq : 1 REGISTER
Via : SIP/2.0/UDP 135.180.130.133
```

26 { Expires : Sun, 01 Dec 2040 16:00:00 GMT

FIG. 7D

```
INFO sip : 1000@10.0.0.1 SIP/2.0
To : 2000 <sip:2000@10.0.0.1>
From : caller_id0 <sip:1000@10.0.0.1>

Call-ID : 0ha0isndaksdj@10.0.0.1
CSeq : 1 INFO
Via : SIP/2.0/UDP 135.180.130.133
```

27 {
Content-Type : application/jpg
Content-Length : 1024 abd2384fed. . . . .

PROVIDING SUBSCRIBER INFORMATION IN VOICE OVER IP (VOIP) SYSTEM

CLAIM OF PRIORITY

This application makes reference to, incorporates the same herein, and claims all benefits accruing under 35 U.S.C. §119 from an application entitled METHOD AND APPARATUS OF PROVIDING SUBSCRIBER INFORMATION IN VOICE OVER IP (VoIP) SERVICE PROVIDING SYSTEM earlier filed in the Korean Intellectual Property Office on Sep. 24, 2004 and thereby duly assigned Serial No. 2004-77170.

BACKGROUND OF THE INVENTION

1. Field of the Invention

The present invention relates to providing subscriber information in a Voice over IP (VoIP) system and, more particularly, to a method and apparatus of providing subscriber information in a VoIP system capable of providing, as subscriber information, a variety of multimedia information instead of simple text-based subscriber information when providing a caller identification service.

2. Description of the Related Art

The Voice over IP (VoIP) refers to an Internet telephony technology for a series of apparatus that transfers voice information using an internet protocol (IP). The VoIP is not a line based protocol like a protocol for a public switched telephone network (PSTN). The VoIP transfers voice information in a digital form within discrete packets.

This VoIP or Internet telephony technology enables telephone users to receive toll and international call services only with a local telephone rate under an Internet or Intranet environment by utilizing an existing IP network as it is to implement an integrated voice call service.

For example, H.323, a session initiation protocol (SIP), and a media gateway control protocol (MGCP) have been defined as protocols for implementing the VoIP. At present, the SIP, which is a simple text-based application layer control protocol, is widely being used.

The SIP is intended to establish and control sessions between terminals or users. The SIP is a simple text-based application layer control protocol and enables one or more participants to establish, modify and terminate the sessions in a cooperative manner. Such sessions can include, for example, Internet teleconferencing, telephony, meeting, and instant messaging services.

The SIP was developed by the Multiparty Multimedia Session Control (MMUSIC) working group of the Internet Engineering Task Force (IETF), and was published in March, 1993. Its standard draft was generally described in 'Request for Comments (RFC) 3261.'

To make a voice call to a called IP terminal, a calling IP terminal transmits an 'INVITE message', which is a call request message, to the called IP terminal.

The called IP terminal transmits a return message in response to the call request message received from the calling IP terminal to setup a call with the calling IP terminal.

The calling IP terminal transmits the 'INVITE' message as the call request message to the called IP terminal.

The called IP terminal, which has received the 'INVITE' message, transmits a '180 ringing' message to the calling IP terminal to notify the calling IP terminal that the called IP terminal has received the 'INVITE' message.

The called IP terminal also transmits a '200 OK' message in response to the 'INVITE' message to notify the calling IP terminal that the called IP terminal has accepted the invitation to the session.

In response to the '200 OK' message, the calling IP terminal transmits an 'ACK' message, which is a final acknowledgment message, to the called IP terminal. This sets up a call between the calling IP terminal and the called IP terminal to perform a voice call.

When the called IP terminal desires to terminate the call after the call has been established and the voice call has been performed between the calling IP terminal and the called IP terminal as described above, the called IP terminal transmits a 'BYE' message to the calling IP terminal in order to terminate the call.

The calling IP terminal transmits the '200 OK' message to the called IP terminal to acknowledge the 'BYE' message after receiving the 'BYE' message from the called IP terminal, resulting in a call termination between the IP terminals.

In a typical VoIP based voice call service, subscriber information including Caller IDentification (CID) information of the calling IP terminal is transferred to the called IP terminal by transferring simple text-based CID information of the calling IP terminal to the called IP terminal.

SUMMARY OF THE INVENTION

The present invention, therefore, has been made to solve the aforementioned problem. The object of the present invention is to provide a method and apparatus of providing subscriber information in a VoIP service providing system capable of transmitting multimedia data (e.g., graphics data or image data) depending on CID information of respective IP terminals connected to the VoIP service providing system to a called IP terminal, or of transmitting multimedia data to the respective IP terminals belonging to each group in response to a subscriber's request while managing address information of the respective IP terminals in a group form.

According to an aspect of the present invention for achieving the aforementioned object, a Voice over IP (VoIP) system is provided comprising: a service providing server adapted to register a relevant terminal with a subscriber information providing service and to provide data corresponding to subscriber information upon receiving a request for the subscriber information providing service; and at least one terminal adapted to transmit a service request message to the service providing server to request registering the terminal with the subscriber information providing service, to store the data provided from the service providing server, and to generate a subscriber information message containing the stored data and to transmit the generated subscriber information message to a called terminal upon generating a call request message in response to a subscriber's selection.

Each of the terminals is preferably adapted to set a value of an Expires field of a REGISTER message for a 'REGISTER method' of a Session Initiation Protocol (SIP) to a predetermined value to generate a request message and to transmit the generated request message to the service providing server.

The service providing server is preferably adapted to register each terminal with the subscriber information providing service upon the Expires field value of the REGISTER message received from the relevant terminal being greater than a current time value, and to delete the registration of the relevant terminal from the subscriber information providing service upon the Expires field value being equal to the current time value.

The subscriber information message is preferably generated by the at least one terminal by adding the data stored in a content field of an INFO message for an 'INFO method' in an SIP.

The data is multimedia data preferably comprising at least one of graphics data and moving picture data.

According to another aspect of the present invention for achieving the aforementioned object, a Voice over IP (VoIP) system is provided comprising: at least one terminal adapted to transmit a subscriber information message containing service request information to a service providing server upon generating a call request message while registering the terminal with a subscriber information providing service; wherein the service providing server is adapted to manage data depending on unique information of each terminal, and the service providing server is adapted to add the data depending on the unique information of the terminal to the subscriber information message and to transmit the resultant message to a called terminal upon the subscriber information message received from the terminal containing the service request information.

The service providing server is preferably adapted to manage address information of the respective terminals in a group form in which identification information is assigned, and to broadcast a subscriber information message containing the data to respective terminals belonging to a relevant group upon receiving a group transmission message including the group identification information.

Each terminal is preferably adapted to incorporate the group identification information into destination information of an INVITE message for an 'INVITE method' of an SIP and to generate the group transmission message.

The service providing server is preferably adapted to manage data depending on at least one unique piece of information assigned to each terminal.

The service providing server is preferably adapted to recognize a unique piece of information of a relevant terminal contained in the subscriber information message received from each terminal, and to incorporate the data depending on the unique piece of information into the subscriber information message and to transmit the resultant message to the called terminal.

According to yet another aspect of the present invention for achieving the aforementioned object, a Voice over IP (VoIP) terminal is provided comprising: a storage unit adapted to store data provided from the service providing server; and a call processor adapted to transmit a registration request message to the service providing server in response to a subscriber's selection and to then transmit a data request message, and to generate a subscriber information message containing the data stored in the storage unit and to transmit the generated subscriber information message to a called terminal upon generating a call request message.

The call processor is adapted to preferably transmit a subscriber information message containing service request information to the service providing server upon generating the call request message, the service providing server adapted to manage data depending on unique information of the terminal.

According to still another aspect of the present invention for achieving the aforementioned object, a method is provided comprising: providing a Voice over IP (VoIP) system including at least one terminal and a server; transmitting a request message from each of the at least one terminals to the server to request registration of the terminal with a subscriber information providing service; registering the terminal with the service in response to the received request message and then providing data corresponding to subscriber information to the terminal, the server registering the terminal and then providing data; transmitting a subscriber information message containing the data provided from the server to a called terminal upon generating a call request message in response to a subscriber's selection, the subscriber information message being transmitted by the server; and outputting multimedia information depending on the data contained in the received subscriber information message, the multimedia information being outputted by the terminal.

Transmitting the data to each terminal preferably comprises: transmitting a data request message to the server from each terminal; transmitting information about the type of possible data to each terminal from the server; selecting one type of data from the received information as to the type of data to transmit a provision request message to the server from each terminal; and transmitting the data depending on the provision request message to a relevant terminal from the server.

According to yet another aspect of the present invention for achieving the aforementioned object, a method is provided comprising: providing subscriber information in a Voice over IP (VoIP) system including at least one terminal and a server; registering data depending on unique information of each of the terminals upon receiving a registration request message from each terminal, the data being registered by the server; recognizing unique information contained in the subscriber information message upon receiving a subscriber information message containing service request information from each terminal; and adding data depending on the recognized unique information to the subscriber information message to transmit the resultant message to a called terminal.

The method preferably further comprises: managing address information of each terminal in a group form in which identification information is assigned, the address information being managed by the server; transmitting a group transmission message containing identification information from each terminal to the server in response to a subscriber's selection; recognizing the address information of each terminal belonging to a relevant group from the identification information contained in the received group transmission message, the address information being recognized by the server; and broadcasting the subscriber information message containing the data to the recognized terminals.

Registering the terminal with the service preferably comprises: displaying a structure to allow the subscriber to designate service registration determination and data; generating a request message in response to a selection of the structure by the subscriber to transmit the generated request message to the server; retransmitting the request message upon not receiving a response message in a predetermined time from the server; and displaying display information corresponding to fail information upon the retransmission number of the request message exceeding a predetermined number.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein:

FIG. 6 is a view of a structure displayed on a display unit according to an exemplary embodiment of the present invention;

FIG. 7A is a view of an SIP based message applied to the present invention;

FIG. 7B is a view of a registration request message applied to the present invention;

FIG. 7C is a view of a registration deletion request message applied to the present invention;

FIG. 7D is a view of a subscriber information message applied to the present invention;

DETAILED DESCRIPTION OF THE INVENTION

Figure 1:
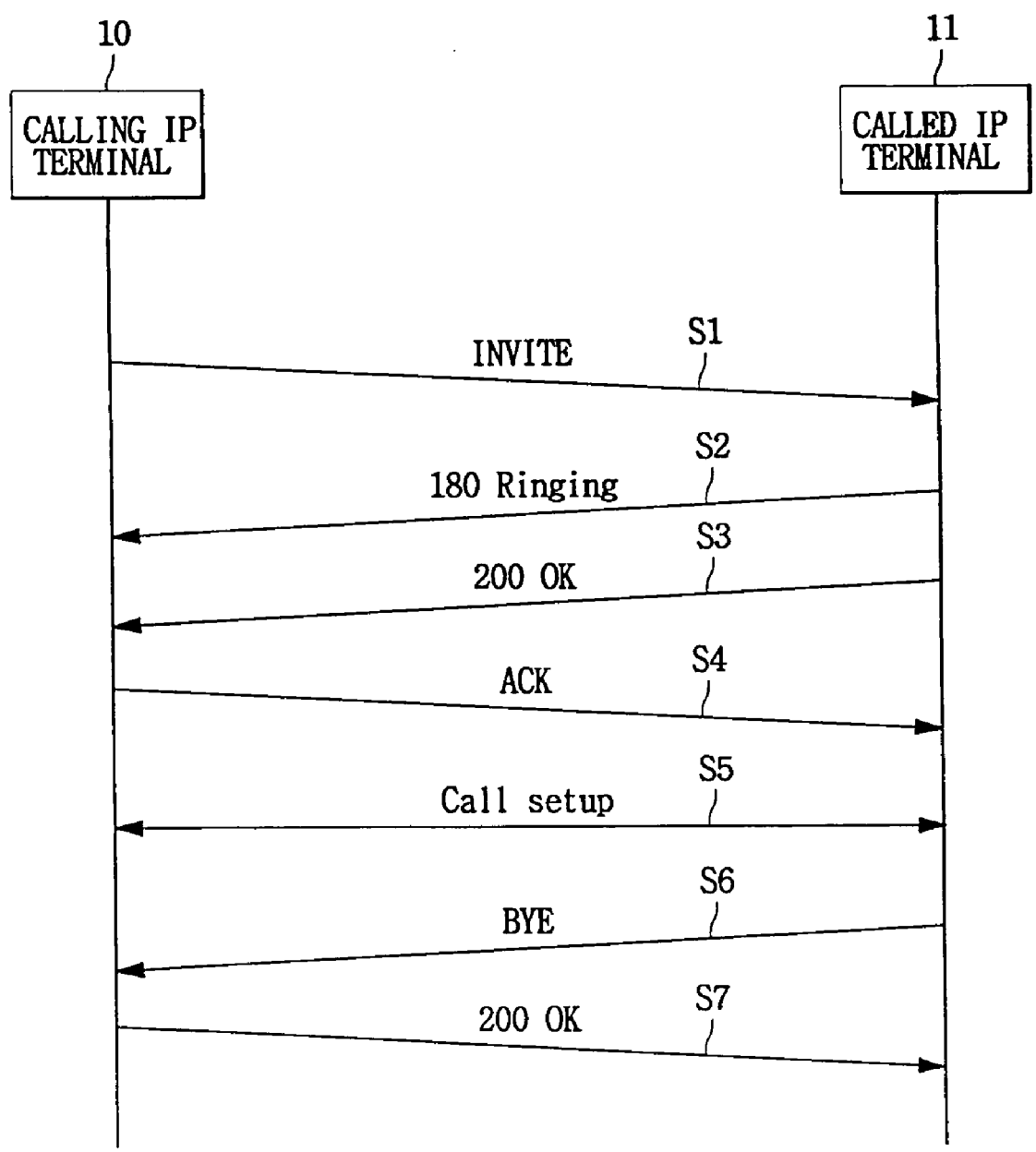
FIG. 1 is a diagram of the flow of setting up a call between IP terminals using a session initiation protocol.

FIG. 1 is a diagram of the flow of setting up a call between IP terminals using a session initiation protocol.

Referring to FIG. 1, to make a voice call to a called IP terminal 11, a calling IP terminal 10 transmits an 'INVITE message', which is a call request message, to the called IP terminal 11.

The called IP terminal 11 transmits a return message in response to the call request message received from the calling IP terminal 10 to setup a call with the calling IP terminal 10.

This call setup process between the IP terminals 10 and 11 will be discussed in more detail with reference to FIG. 1.

The calling IP terminal 10 transmits the 'INVITE' message as the call request message to the called IP terminal 11 (S1).

The called IP terminal 11, which has received the 'INVITE' message, transmits a '180 ringing' message to the calling IP terminal 10 to notify the calling IP terminal 10 that the called IP terminal 11 has received the 'INVITE' message (S2).

The called IP terminal 11 also transmits a '200 OK' message in response to the 'INVITE' message to notify the calling IP terminal 10 that the called IP terminal 11 has accepted the invitation to the session (S3).

In response to the '200 OK' message, the calling IP terminal 10 transmits an 'ACK' message, which is a final acknowledgment message, to the called IP terminal 11 (S4). This sets up a call between the calling IP terminal 10 and the called IP terminal 11 to perform a voice call (S5).

When the called IP terminal 11 desires to terminate the call after the call has been established and the voice call has been performed between the calling IP terminal 10 and the called IP terminal 11 as described above, the called IP terminal 11 transmits a 'BYE' message to the calling IP terminal 10 in order to terminate the call (S 6).

The calling IP terminal 10 transmits the '200 OK' message to the called IP terminal 11 to acknowledge the 'BYE' message after receiving the 'BYE' message from the called IP terminal 11, resulting in a call termination between the IP terminals 10 and 11 (S7).

In a typical VoIP based voice call service, subscriber information including Caller IDentification (CID) information of the calling IP terminal 10 is transferred to the called IP terminal 11 by transferring simple text-based CID information of the calling IP terminal 10 to the called IP terminal 11.

Hereinafter, a method and apparatus of providing subscriber information in a VoIP system according to exemplary embodiments of the present invention will be described in detail with reference to the accompanying drawings.

Figure 2:
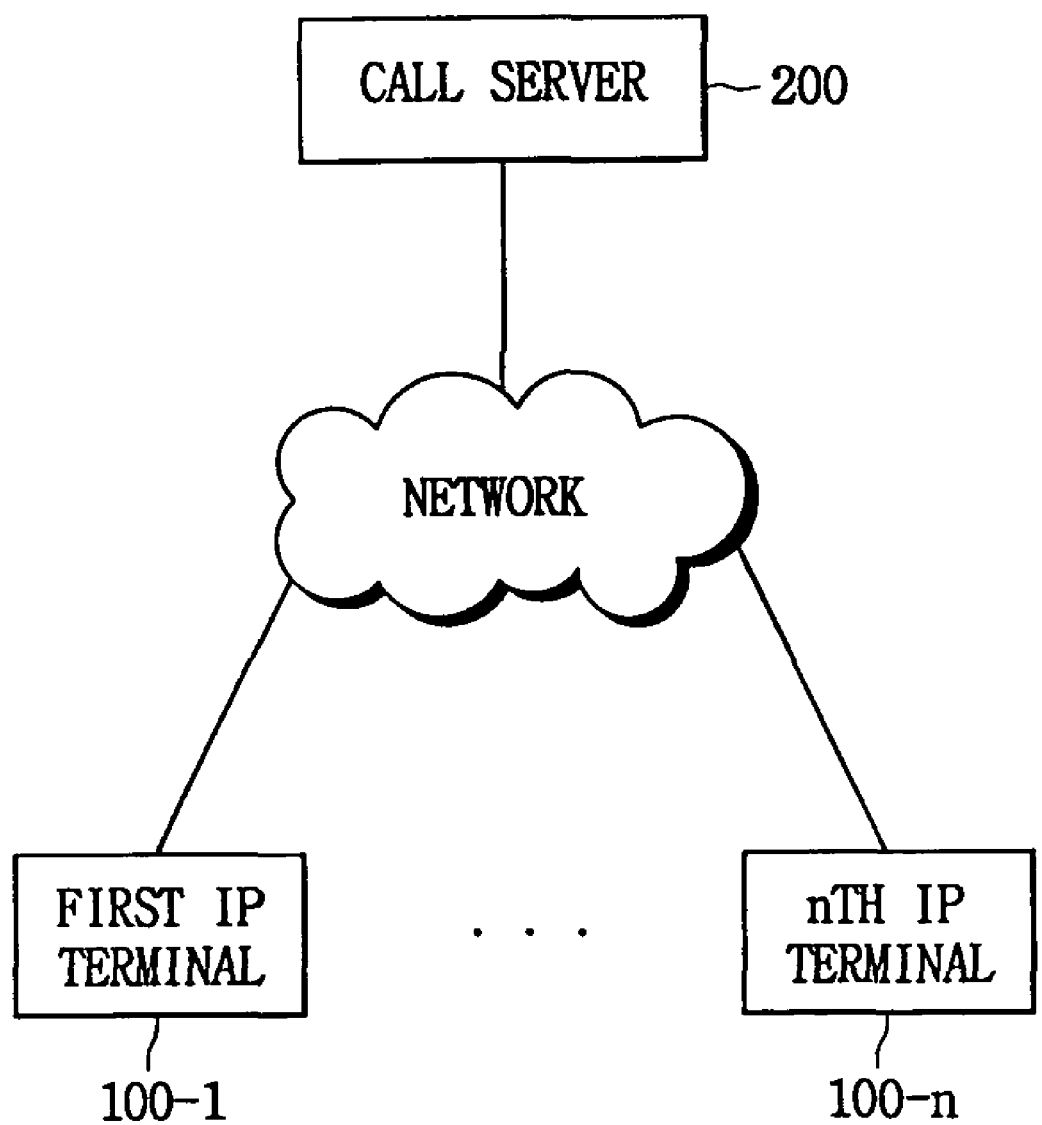
FIG. 2 is a diagram of a VoIP system according to an exemplary embodiment of the present invention.

FIG. 2 is a diagram of a Voice over IP (VoIP) system according to an exemplary embodiment of the present invention.

Referring to FIG. 2, a plurality of IP terminals 100-1 to 100-n are interconnected directly or via a call server 200 over a network.

The network over which the IP terminals 100-1 to 100-n and the call server 200 are connected can be an Internet or Intranet network.

Each of the IP terminals 100-1 to 100-n transmits a VoIP based request message to the call server 200 or a called IP terminal 100-1 to 100-n and transmits a response message to the other IP terminal 100-1 to 100-n in response to the request message received from the other IP terminal 100-1 to 100-n, such that a VoIP based voice call service is provided to a subscriber.

Each of the IP terminals 100-1 to 100-n also transmits a data request message to the call server 200, stores multimedia data from the call server 200, and transmits a subscriber information message containing the multimedia data to the other IP terminal 100-1 to 100-n while transmitting a call request message to the called IP terminal 100-1 to 100-n in response to a subscriber's request.

Each of the IP terminals 100-1 to 100-n transmits a registration request message to the call server 200 in response to a subscriber's selection so that the IP terminal is registered with a subscriber information providing service, and transmits a call request message to the called IP terminal 100-1 to 100-n and then transmits a subscriber information message to the call server 200. The call server 200 transmits the subscriber information message containing the registered multimedia data depending on the CID information of the relevant IP terminal 100-1 to 100-n to the called IP terminal 100-1 to 100-n.

When receiving the data request message from each of the IP terminals 100-1 to 100-n, the call server 200 provides possible multimedia data to the relevant IP terminal 100-1 to 100-n. The call server 200 also registers and manages the multimedia data depending on the CID information of the IP terminal in response to the registration request message.

If the subscriber information message received from each of the IP terminals 100-1 to 100-n does not include the multimedia data, the call server 200 bypasses the received subscriber information message to the relevant IP terminal 100-1 to 100-n.

On the other hand, if the received subscriber information message does contain the multimedia data, the call server 200 recognizes the CID information of the relevant IP terminal 100-1 to 100-n and retrieves multimedia data depending on the relevant CID information.

The call server 200 then transmits the subscriber information message containing the retrieved multimedia data to the called IP terminal 100-1 to 100-n.

The call server 200 also manages address information of the IP terminals 100-1 to 100-n in a group form. When receiving a group information message from the IP terminal 100-1 to 100-n, the call server 200 broadcasts the multimedia data depending on the CID information of the relevant IP terminal to the respective IP terminals 100-1 to 100-n belonging to the relevant group.

Each of the IP terminals 100-1 to 100-n displays multimedia information depending on the multimedia data contained in the received subscriber information message.

Figure 3:
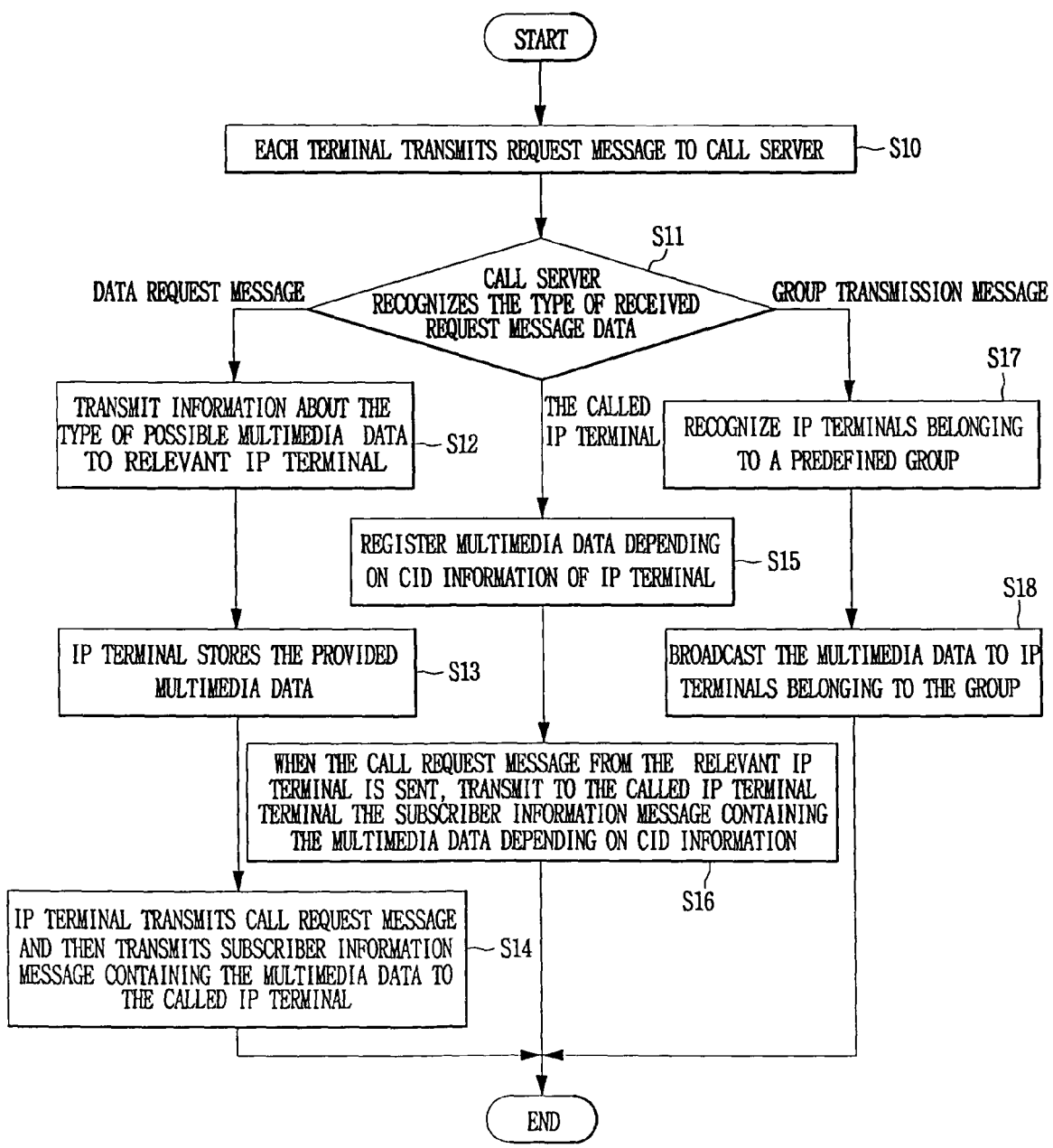
FIG. 3 is a flowchart of a method of providing subscriber information according to an exemplary embodiment of the present invention.

FIG. 3 is a flowchart of a method of providing subscriber information according to an exemplary embodiment of the present invention.

Referring to FIG. 3, each of the IP terminals 100-1 to 100-n transmits a request message to the call server 200 in response to a subscriber's selection (S10).

The call server 200 confirms whether the received request message is a registration request message, a data request message, or a group transmission message (S11).

If the received request message is a data request message, the call server 200 transmits information as to the type of possible multimedia data to the relevant IP terminal 100-1 to 100-n (S12).

The IP terminal 100-1 to 100-n displays the information as to the type of multimedia data, transmits a provisional request message to the call server 200 in response to a subscriber's selection, and then stores the multimedia data provided from the call server 200 (S13).

The IP terminal 100-1 to 100-n transmits a call request message to the called IP terminal 100-1 to 100-n in response to a subscriber's selection, and then transmits a subscriber information message containing the stored multimedia data to the called IP terminal 100-1 to 100-n (S14).

If the received request message is a registration request message, the call server 200 registers and stores multimedia data depending on the CID information of the relevant IP terminal 100-1 to 100-n (S15).

When the call request message from the relevant IP terminal 100-1 to 100-n is sent to the called IP terminal 100-1 to 100-n, the call server 200 retrieves the multimedia data depending on the CID information of the relevant IP terminal 100-1 to 100-n, and transmits the subscriber information message containing the retrieved multimedia data to the called IP terminal 100-1 to 100-n (S16).

If the received request message is a group transmission message, the call server 200 recognizes address information of the respective IP terminals 100-1 to 100-n belonging to a predefined group (S17).

For example, when the call server 200 manages the address information of the respective IP terminals 100-1 to 100-n for each group, the call server 200 assigns unique identification information to each group and transmits the assigned identification information to the respective IP terminals 100-1 to 100-n.

The respective IP terminals 100-1 to 100-n then generate a group transmission message containing the identification information for each group in response to a subscriber's selection.

The call server 200 broadcasts the multimedia data depending on the CID information of the IP terminal 100-1 to 100-n, which has sent the group transmission message, to the IP terminals 100-1 to 100-n belonging to the group, which corresponds to the identification information contained in the received group transmission message (S18).

The call server 200 can register the multimedia data depending on the CID information of the respective IP terminals 100-1 to 100-n, and can broadcast the subscriber information message containing the previously registered multimedia data to the respective IP terminals 100-1 to 100-n belonging to the relevant group, which corresponds to group identification information set as destination information for the received group transmission message.

Figure 4:
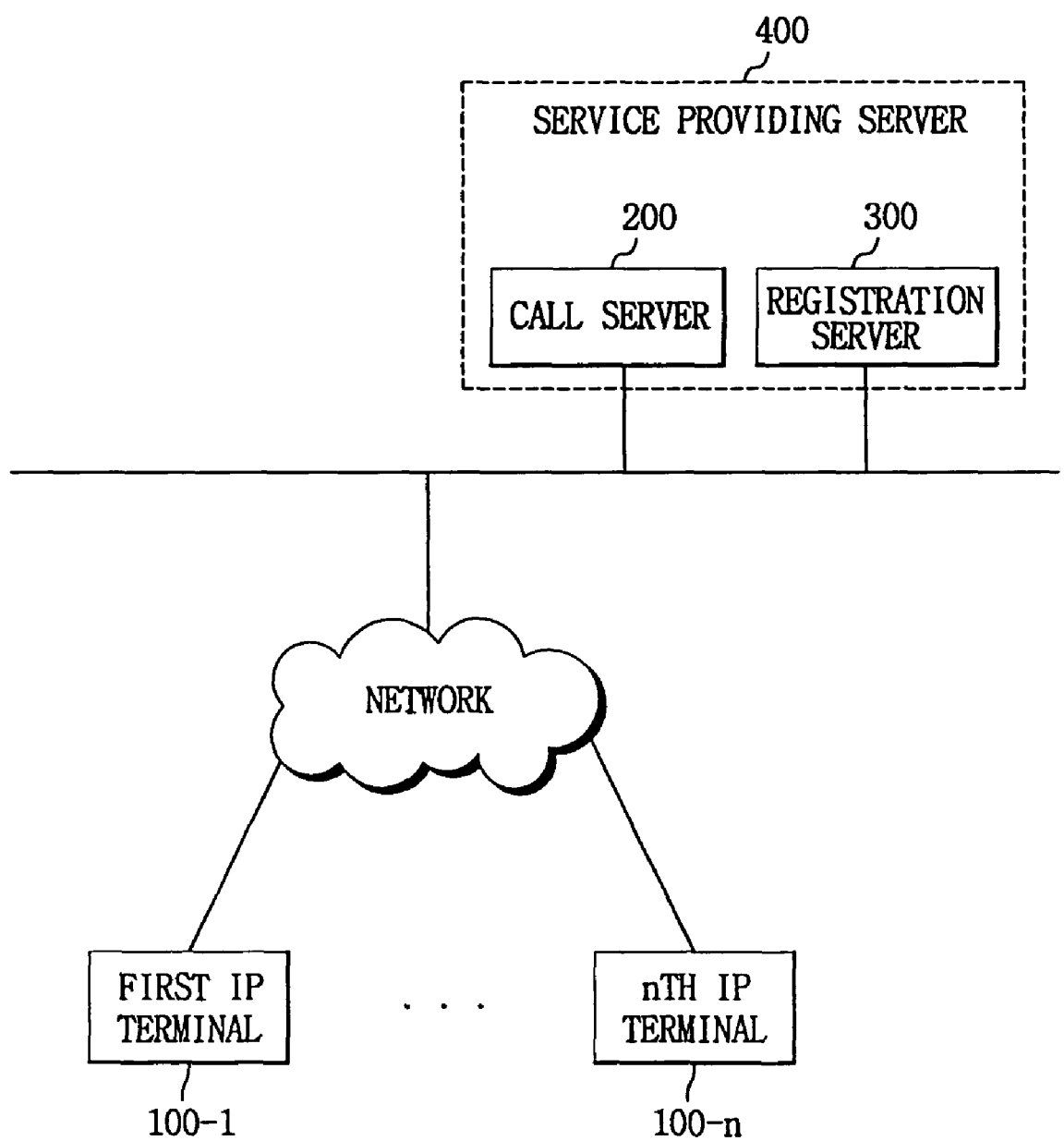
FIG. 4 is a block diagram of a VoIP system according to another exemplary embodiment of the present invention.

FIG. 4 is an overall block diagram of a VoIP service providing system according to another exemplary embodiment of the present invention.

Referring to FIG. 4, a plurality of IP terminals 100-1 to 100-n are connected to a service providing server 400 over a network. The service providing server 400 includes a call server 200 and a registration server 300.

Each of the IP terminals 100-1 to 100-n transmits a VoIP based call request message to the call server 200 or to the called IP terminal 100-1 to 100-n over the network. When receiving a response message, the IP terminals 100-1 to 100-n establish a VoIP based call with the called IP terminal 100-1 to 100-n, such that a voice call service is provided to a subscriber.

After connecting to the call server 200, the respective IP terminals 100-1 to 100-n can register the multimedia data depending on the CID information or can download the multimedia data from the call server 200 and store the downloaded multimedia data therein.

Each of the IP terminals 100-1 to 100-n also transmits the call request message to the other IP terminal 100-1 to 100-n and then transmits a subscriber information message containing the downloaded multimedia data to the other IP terminal 100-1 to 100-n.

Figure 5:
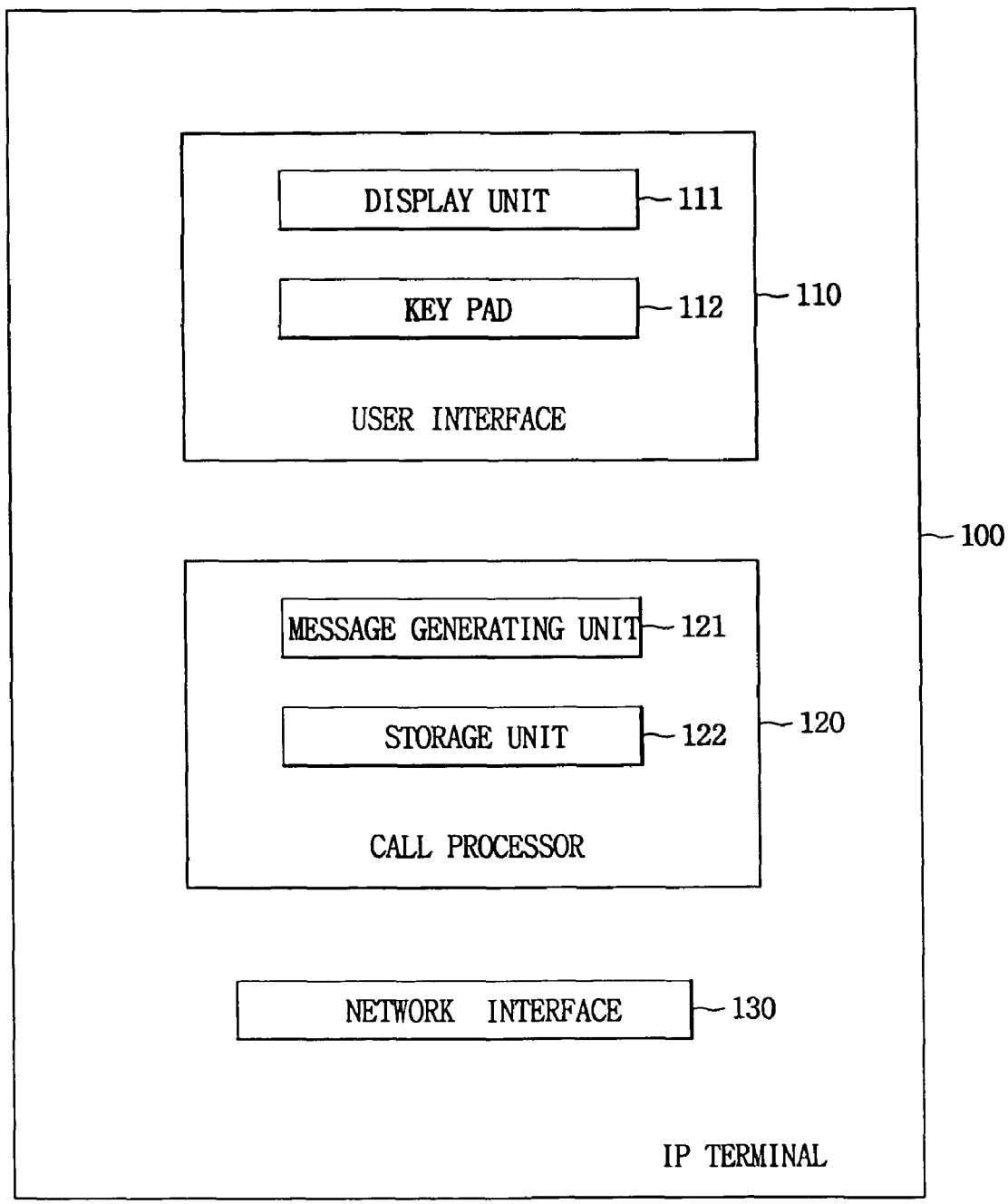
FIG. 5 is an internal block diagram of an IP terminal according to an exemplary embodiment of the present invention.

FIG. 5 is an internal block diagram of an IP terminal according to an exemplary embodiment of the present invention.

Referring to FIG. 5, the IP terminal 100 includes a user interface 110, a call processor 120, and a network interface 130.

The user interface 110 includes a display unit 111 and a keypad 112, and the call processor 120 includes a message generating unit 121 and a storage unit 122.

In the user interface 110, the display unit 111 outputs display information in response to a display signal received from the call processor 120.

The keypad 112 provides a relevant key signal to the call processor 120 when a key button is selected by a user.

The network interface 130 performs an interface function to allow the IP terminal 100 to set up the call through the exchange of a message with the called IP terminal over the network.

In the call processor 120, the message generating unit 121 generates a call request message, a subscriber information message, a registration request message, a registration deletion message, and a data request message depending on a subscriber's selection.

When receiving the multimedia data from the call server 200, the call processor 120 stores the received multimedia data in the storage unit 122, and provides a display signal depending on the multimedia data contained in the subscriber information message which is received from the other IP terminal or the call server 200, to the display unit 111.

FIG. 6 is a diagram of a structure displayed on a display unit according to an exemplary embodiment of the present invention.

As shown in FIG. 6, the display unit 111 displays a structure consisting of a plurality of fields.

Specifically, the display unit 111 displays at least one of a registration determination field (a), a designation field (b), a character string field (c), and a data field (d).

The registration determination field (a) is a field to determine whether an IP terminal is registered with a subscriber information providing service in which the subscriber information of the relevant IP terminal 100 is provided to the called IP terminal. The designation field (b) is a field to designate text information provided to the other IP terminal among a plurality of text information depending on the CID information of the relevant IP terminal 100. The character string field (c) is a field to specify the text information of the relevant IP terminal 100, and the data field (d) is a field to specify a position of multimedia data to be provided to the other IP terminal.

For example, the registration field (a) enables to select multimedia data depending on text information to be provided to the other IP terminal from the text information depending on a plurality of CID information of the relevant IP terminal 100, and the designation field (b) enables to designate the multimedia data to be transferred to the called IP terminal through a subscriber information message among multimedia data depending on a plurality of text information.

Furthermore, the character string field (c) enables a subscriber to confirm text information depending on a plurality of CID information registered with the call server 200, and the data field (d) enables the subscriber to confirm a position of the multimedia data to be provided to the called IP terminal. For example, "../mypic0" in the data field (d) is information about a directory of the storage unit 122 of the IP terminal 100 in which the multimedia data has been stored, and "sp_data" indicates that the multimedia data has been stored in the registration server 300.

A description follows as to how the IP terminal processes a message based on a Session Initiation Protocol (SIP) of VoIPs. It will be appreciated that this description can be applied to the case where another VoIP is used.

FIG. 7A is a view of an SIP based message applied to the present invention.

The message shown in FIG. 7A is an INVITE message that is a call request message in accordance with an 'INVITE method' of the SIP.

This INVITE message includes a start line field 20, a normal header field 21, a request header field 22, an entity header field 23, a depletion line field 24, and a message information field 25.

The start line field 20 indicates the start of the 'INVITE' message. The normal header field 21 is applied to both a request message and a response message. 'Via' specifies a selected path, 'TO' specifies a responding participant to the request, 'From' specifies an initiator of the request, 'Call-ID' specifies all registrations of specific call invitation or specific clients, and 'CSeq' specifies the priority of a relevant message.

The request header field 22 functions to explain the usage of the relevant message, and the entity header field 23 indicates the type and length of the message information.

The depletion line field 24 is a field to secure the size of an SIP based INVITE message, and the message information field 25 indicates information needed to set up a call.

Because the IP terminal using the SIP uses a simple text-based message as stated above, it is easy to add to the message the multimedia data depending on the subscriber information.

In the IP terminal 100, the message generating unit 121 can set the 'to' field of the normal header field 21 of the INVITE message to identification information of a relevant group when generating a group transmission message in response to a subscriber's selection.

FIG. 7B is a view of a registration request message applied to the present invention.

As shown in FIG. 7B, a REGISTER message for the 'REGISTER method' of the SIP can be used as the registration request message. The IP terminal 100 according to the present invention can generate a registration request message or a registration deletion request message based on the value of an Expires field 26 of the registration request message.

That is, when generating the registration request message in response to a subscriber's selection, the IP terminal 100 sets the value of the Expires field 26 of the REGISTER message to a value larger than a current time value to generate the registration request message.

The IP terminal 100 sets the value of the Expires field 26 to a value larger than the current time value so as that the call server 200 receiving the REGISTER message registers the relevant IP terminal 100 with the subscriber information providing service, in which the value of the Expires field 26 acts as a service termination time point for the relevant IP terminal 100.

FIG. 7C is a view of a registration deletion request message applied to the present invention. As shown in FIG. 7C, the IP terminal 100 can set the value of the Expires field 26 of the REGISTER message to a current time value in response to a subscriber's selection to generate a registration deletion request message.

That is, the IP terminal 100 sets the value of the Expires field 26 of the REGISTER message to the current time value. The call server 200 receiving the REGISTER message determines that the registered service time of the relevant IP terminal has elapsed since the value of the Expires field 26 is the current time value, and deletes the service registration of the relevant IP terminal 100.

FIG. 7D is a view of a subscriber information message applied to the present invention.

As shown in FIG. 7D, the IP terminal 100 can generate a subscriber information message containing multimedia data through an INFO message for an 'INFO method' in the SIP.

Specifically, the IP terminal 100 can add the multimedia data to a content field 27 of the INFO message to generate the subscriber information message.

If the IP terminal 100 stores the multimedia data downloaded from the call server 200, the IP terminal 100 specifies the type of the multimedia data in a 'Content-type' field, specifies the size of the multimedia data in a 'Content-Length' field, and then adds the multimedia data to generate the subscriber information message.

On the contrary, when the call server 200 manages the multimedia data depending on the CID information, the IP terminal 100 sets the 'Content-Length' field value to '0' to generate the subscriber information message and then transmits the subscriber information message to the call server 200.

When receiving the subscriber information message having the 'Content-Length' field value set to '0', the call server 200 extracts the CID information, which has been set in the 'Call-ID' field, and retrieves multimedia data based on the extracted CID information.

The call server 200 adds the retrieved multimedia data to the received subscriber information message, sets the 'Content-Length' field value to the size of the multimedia data, and then transmits the resultant message to the called IP terminal 100.

Figure 8:
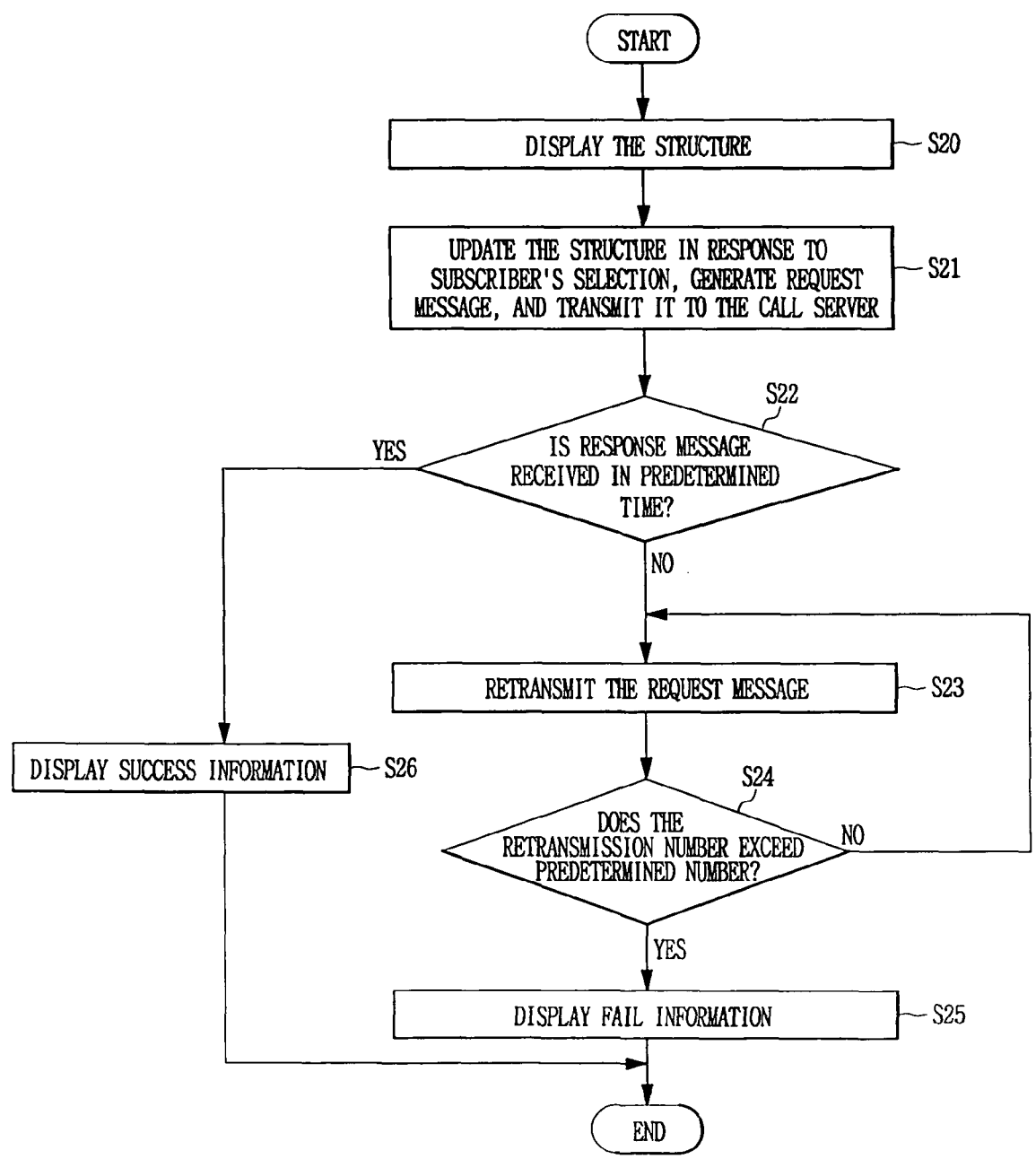
FIG. 8 is a flowchart of a method in which an IP terminal registers subscriber information according to an exemplary embodiment of the present invention.

FIG. 8 is a flowchart of a method in which an IP terminal registers subscriber information according to an exemplary embodiment of the present invention.

Referring to FIG. 8, the IP terminal 100 displays the same structure as shown in FIG. 6 on the display unit 111 (S20).

When the subscriber selects the registration determination field a of the structure by means of the keypad 112, the IP terminal 100 updates the displayed structure, generates a registration request message or a registration deletion request message, and transmits the request message to the call server 200 (S21).

In the IP terminal 100, the message generating unit 121, as shown in FIG. 7B, can set the value of the Expires field 26 of the REGISTER message to be larger than the current time value to generate the registration request message, or can set the value of the Expires field 26 to the current time value to generate the registration deletion request message.

The IP terminal 100 transmits the registration request message or the registration deletion request message to the call server 200, and determines whether a '200 OK' message as a response message is received in a predetermined time (S22).

If the IP terminal 100 does not receive the response message in the predetermined time, the IP terminal 100 retransmits the request message to the call server 200 (S23) and determines whether the retransmission number of the request message exceeds a predetermined number, for example, 'seven' times (S24).

If the retransmission number of the request message exceeds seven, the IP terminal 100 displays display information corresponding to fail information (S25).

When receiving the '200 OK' message as a response message from the call server 200 in the predetermined time after transmitting the registration request message, the IP terminal 100 displays display information corresponding to success information (S26).

When receiving a data request message from the IP terminals 100-1 to 100-n, the call server 200 transmits information as to the type of possible multimedia data to the IP terminal 100-1 to 100-n and transmits selected multimedia data to the IP terminal 100-1 to 100-n.

When receiving the registration request message from the IP terminals 100-1 to 100-n, the call server 200 registers the relevant IP terminals 100-1 to 100-n with the subscriber information providing service and registers multimedia data depending on the CID information of the relevant IP terminals 100-1 to 100-n with the registration server 300.

Furthermore, when receiving a group transmission message from the IP terminals 100-1 to 100-n, the call server 200 broadcasts the multimedia data depending on the CID information of the relevant IP terminals 100-1 to 100-n, to the respective IP terminals 100-1 to 100-n belonging to a predefined group.

The registration server 300 registers the multimedia data depending on the CID information of the IP terminals 100-1 to 100-n registered via the call server 200 and the address information of the IP terminals 100-1 to 100-n connected over the network in a group form.

Figure 9:
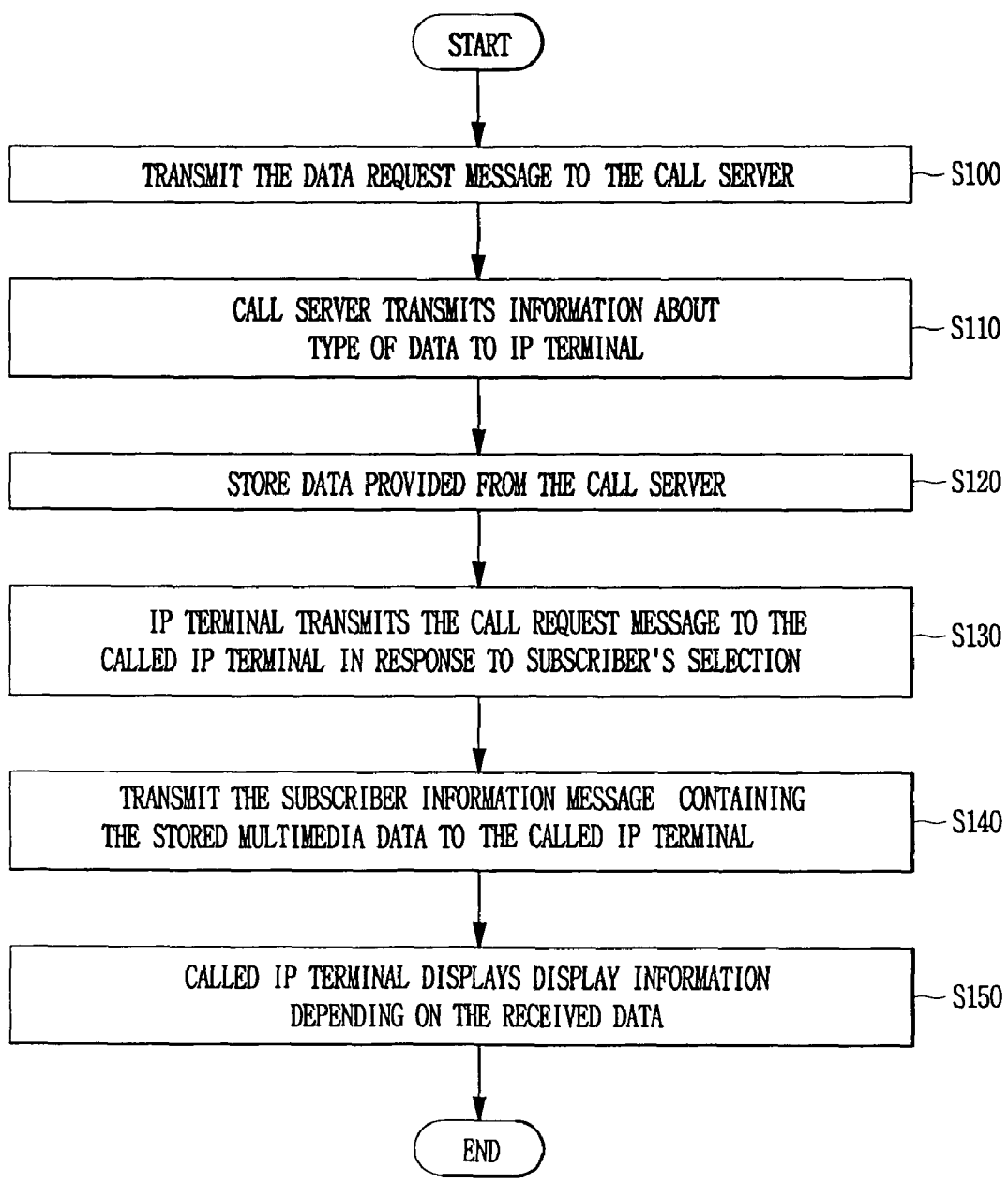
FIG. 9 is a flowchart of a method of providing subscriber information according to a first exemplary embodiment of the present invention.

FIG. 9 is a flowchart of a method of providing subscriber information according to a first exemplary embodiment of the present invention.

Referring to FIG. 9, the IP terminal 100 generates a data request message in response to a subscriber's request and transmits the data request message to the call server 200 while the IP terminal 100 is connected to the call server 200 over the network (S100).

When receiving the data request message from the IP terminal 100, the call server 200 transmits information as to the type of possible multimedia data to the IP terminal 100 (S110).

The IP terminal 100 displays the information as to the type of multimedia data received from the call server 200, transmits a provision request message to the call server 200 in response to a subscriber's selection, and then stores the multimedia data from the call server 200 (S120).

The call server 200 transmits the identification information of the multimedia data while transmitting the information as to the type of multimedia data, and a subscriber selects certain multimedia data from the displayed information as to the type of the multimedia data.

The IP terminal 100 transmits the provision request message containing the identification information of the multimedia data to the call server 200 in response to a subscriber's selection, and the call server 200 can provide the multimedia data based on the identification information contained in the received provision request message.

The IP terminal 100 transmits the call request message to the called IP terminal 100 in response to a subscriber's selection (S130).

For example, when the IP terminal 100 sets up a call according to the SIP, the IP terminal 100 generates an INVITE message as a call request message in response to a subscriber's selection, and transmits the generated INVITE message to the called IP terminal 100.

The IP terminal 100 can transmit the call request message to the call server 200 and the call server 200 can transmit the received call request message to the called IP terminal 100. Alternatively, the IP terminal 100 can transmit the generated call request message directly to the called IP terminal 100.

The called IP terminal 100 receiving the call request message transmits a response message according to the SIP.

The IP terminal 100 transmits the call request message to the called IP terminal 100, and generates the subscriber information message containing the stored multimedia data to transmit the subscriber information message to the called IP terminal 100 (S140).

The IP terminal 100, as illustrated in FIG. 7D, can add the stored multimedia data to the content field 27 of the INFO message for the 'INFO method' in the SIP to generate the subscriber information message.

Furthermore, if the IP terminal 100 transmits the generated subscriber information message to the call server 200, the call server 200 determines whether the added multimedia data is present in the content field 27 of the received subscriber information message. If the multimedia data is present, the call server 200 bypasses the subscriber information to the called IP terminal 100 based on destination information in the received subscriber information message.

When receiving the subscriber information message, the called IP terminal 100 extracts the multimedia data added to the content field 27 and displays display information depending on the extracted multimedia data (S150).

Figure 10:
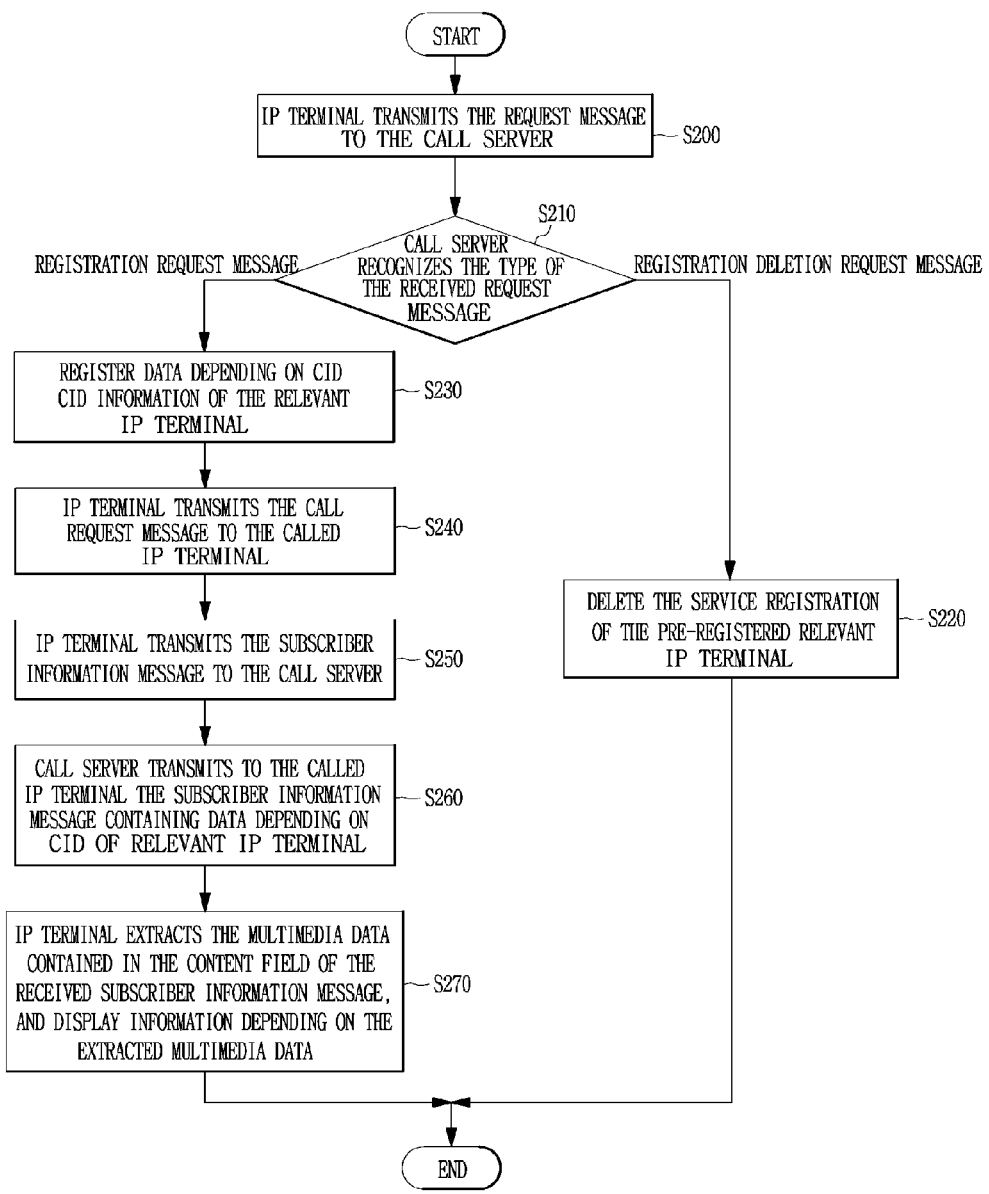
FIG. 10 is a flowchart of a method of providing subscriber information according to a second exemplary embodiment of the present invention.

FIG. 10 is a flowchart of a method of providing subscriber information according to a second exemplary embodiment of the present invention.

Referring to FIG. 10, the IP terminal 100 generates a request message in response to a subscriber's selection and transmits the generated request message to the call server 200 (S200).

For example, when the IP terminal 100 processes the message according to the SIP, the IP terminal 100 displays the same structure as in FIG. 6 and generates a registration request message or a registration deletion request message in response to a selection of the registration determination field a by the subscriber.

If the subscriber selects the registration request through the registration determination field (a) of the structure (O), the IP terminal 100 sets the value of the Expires field 26 of the REGISTER message for the 'REGISTER method' illustrated in FIG. 7B to be larger than a current time value to generate the registration request message.

On the other hand, if the subscriber selects the registration deletion through the registration determination field (a) of the structure (X), the IP terminal 100 sets the value of the Expires field 26 to the current time value as illustrated in FIG. 7C to generate the registration deletion request message.

The call server 200 determines whether the request message from the IP terminal 100 is the registration request message or the registration deletion request message based on the value of the Expires field 26 of the REGISTER message contained in the request message received from the IP terminal 100 (S210).

The call server 200 deletes the service registration of the pre-registered relevant IP terminal if the value of the received Expires field 26 of the REGISTER message is equal to the current time value (S220).

If the value of the Expires field 26 of the received REGISTER message is greater than the current time value, the call server 200 determines the request message to be the registration request message and registers multimedia data depending on the CID information of the relevant IP terminal 100 (S230).

When receiving the registration request message, the call server 200 transmits information as to the type of possible multimedia data to the IP terminal 100, and then registers the multimedia data selected by the IP terminal 100 as multimedia data depending on the CID information of the relevant IP terminal 100.

The IP terminal 100 registers itself with the subscriber information providing service, and then transmits the call request message to the called IP terminal 100 in response to a subscriber's selection (S240).

The IP terminal 100 transmits an INVITE message as the call request message to the call server 200 in response to the subscriber's selection, and the call server 200 recognizes a called IP terminal 100 from the received INVITE message and transmits the received INVITE message to the called IP terminal 100.

The IP terminal 100 transmits the subscriber information message to the call server 200 (S250).

Since the call server 200 manages the multimedia data corresponding to the subscriber information, the IP terminal 100 sets the 'Content-Length' field value of the content field 27 of the INFO message according to the 'INFO method' to '0' to generate the subscriber information message.

Since the 'Content-Length' field value of the content field 27 in the subscriber information message received from the IP terminal 100 is '0', the call server 200 recognizes the CID information of the IP terminal 100 contained in the subscriber information message and retrieves multimedia data depending on the recognized CID information.

The call server 200 adds the retrieved multimedia data to the content field 27 of the subscriber information message and transmits the resultant message to the called IP terminal 100 (S260).

The called IP terminal 100 extracts the multimedia data contained in the content field 27 of the received subscriber information message, and displays display information depending on the extracted multimedia data (S270).

Figure 11:
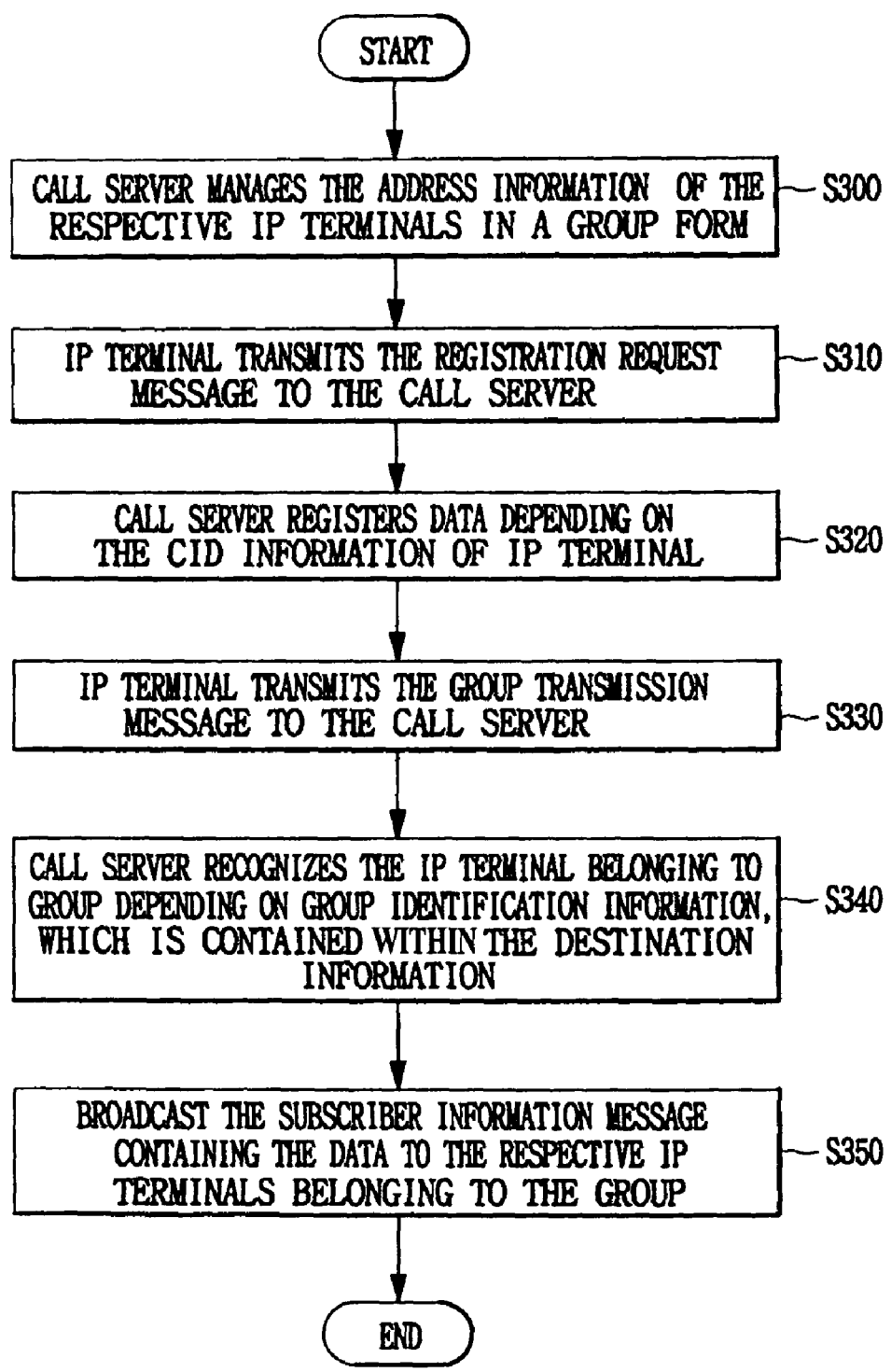
FIG. 11 is a flowchart of a method of providing subscriber information according to a third exemplary embodiment of the present invention.

FIG. 11 is a flowchart of a method of providing subscriber information according to a third exemplary embodiment of the present invention.

Referring to FIG. 11, the call server 200 manages the address information of the IP terminals, which are connected over the network, in a group form (S300).

The call server 200 can store address information of the IP terminals belonging to each group in the registration server 300 in response to a subscriber's request.

Furthermore, the call server 200 can assign unique identification information to each group, which is stored in the registration server 300.

The IP terminal 100 generates the registration request message in response to a subscriber's selection and transmits the generated registration request message to the call server 200 (S310).

When receiving the registration request message from the IP terminal 100, the call server 200 registers multimedia data, which depends on the CID information of the relevant IP terminal 100, with the registration server 300 (S320).

The call server 200 can transmit information as to the type of possible multimedia data to the IP terminal 100 and then register multimedia data selected by the IP terminal 100 as the multimedia data depending on the CID information.

The IP terminal 100 transmits the group transmission message to the call server 200 in response to a subscriber's selection (S330).

For example, the IP terminal can set destination information of the INVITE message for the 'INVITE method' to the group identification information and set the content field to the multimedia data to generate the group transmission message.

The call server 200 recognizes the IP terminal 100 belonging to a group corresponding to group identification information, which is contained as the destination information for the received group transmission message (S340).

The call server 200 also broadcasts the subscriber information message containing the multimedia data to the respective IP terminals belonging to the relevant group (S350).

As described above, according to the present invention, it is possible to provide the multimedia data corresponding to the subscriber information to the called IP terminal in the VoIP based voice call service providing system.

It is also possible to broadcast the multimedia data to the respective terminals belonging to each group in response to a subscriber's request while managing the address information for IP terminals in a group form.

Although exemplary embodiments of the present invention have been described in detail above, it will be apparent to those skilled in the art that various variations and modifications can be made without departing from the spirit and scope of the present invention, and that such variations and modifications are included in the appended claims.

What is claimed is:

1. A Voice over IP (VoIP) system, comprising:
a service providing server to register at least one terminal with a subscriber information providing service and to provide data corresponding to subscriber information in response to receipt of a request for the subscriber information,
wherein the at least one terminal is configured to transmit a service request message to the service providing server to request registration of the at least one terminal with the subscriber information providing service, to store the data provided from the service providing server, to generate a subscriber information message comprising the stored data, and to transmit the generated subscriber information message to a called terminal in response to generation of a call request message.

2. The system of claim 1, wherein the at least one terminal is configured to set a value of an Expires field of a REGISTER message for a 'REGISTER method' of a Session Initiation Protocol (SIP) to a value to generate a request message and to transmit the generated request message to the service providing server.

3. The system of claim 2, wherein the service providing server is configured to register the at least one terminal with the subscriber information providing service in response to a determination that the Expires field value of the REGISTER message received from the at least one terminal is greater than a current time value, and to delete the registration of the at least one terminal from the subscriber information providing service in response to a determination that the Expires field value is equal to the current time value.

4. The system of claim 1, wherein the subscriber information message is generated by the at least one terminal by adding the stored data to a content field of an INFO message for an 'INFO method' in an SIP.

5. The system of claim 1, wherein the data corresponding to subscriber information comprises multimedia data comprising at least one of graphics data and moving picture data.

6. A Voice over IP (VoIP) terminal, comprising:
a call processor to transmit a registration request message to a service providing server and to transmit a data request message to the service providing server; and
a storage unit to store data provided from the service providing server in response to the data request message,
wherein the call processor is configured to generate a subscriber information message comprising the data stored in the storage unit and to transmit the generated subscriber information message to a called terminal in response to generation of a call request message.

7. The terminal of claim 6, wherein the call processor is configured to transmit the subscriber information message to the service providing server in response to generation of the call request message, and wherein the service providing server is configured to manage the data depending on unique information of the terminal.

8. A method of providing a Voice over IP (VoIP) system comprising at least one terminal and a server, the method comprising:
transmitting a data request message from a calling terminal to a server;
transmitting information about a type of possible data from the server to the calling terminal;
selecting one type of data from the received information about the type of possible data and transmitting a provision request message to the server from the calling terminal;
storing data provided from the server in response to the provision request message in a storage unit of the calling terminal;
transmitting a call request message to a called terminal;
transmitting a response message to the calling terminal in response to the call request message; and
generating a subscriber information message comprising the stored data and transmitting the subscriber information message from the calling terminal to the called terminal.

9. A method of providing subscriber information by an Internet Protocol (IP) terminal, the method comprising:
transmitting a request message to a call server in response to a subscriber's selection;
receiving a subscriber information message according to the request message from the call server; and
transmitting the subscriber information message to a called IP terminal,
wherein the request message is one of a registration request message, a data request message and a group transmission message,
wherein the method further comprises, if the request message is the data request message:
displaying information about a type of multimedia data, and transmitting a provision request message to the call server in response to a subscriber's selection, and storing multimedia data provided from the call server, and transmitting a call request message to the called IP terminal in response to the subscriber's selection, and then transmitting a subscriber information message containing the stored multimedia data to the called IP terminal,
wherein the method further comprises, if the request message is the registration request message:
sending a call request message to the called IP terminal; and
receiving, by the called IP terminal, the subscriber information message containing retrieved multimedia data from the call server,
wherein the method further comprises, if the received request message is the group transmission message:
receiving assigned identification information from the call server;
generating a group transmission message containing the identification information for each group in response to a subscriber's selection; and
receiving broadcasted multimedia data from the called server.

* * * * *